United States Patent [19]
Klein

[11] Patent Number: 5,164,079
[45] Date of Patent: Nov. 17, 1992

[54] FILTERING APPARATUS FOR SEPARATING SOLID AND SUSPENDED MATTER FROM A LIQUID

[75] Inventor: Walter Klein, Lenzing, Austria

[73] Assignee: Lenzing Aktiengesellschaft, Lenzing, Austria

[21] Appl. No.: 550,643

[22] Filed: Jul. 10, 1990

[30] Foreign Application Priority Data

Jul. 18, 1989 [AT] Austria ............................. A1731/89

[51] Int. Cl.$^5$ ...................... B01D 35/18; B01D 35/22
[52] U.S. Cl. ................................... 210/186; 210/408; 210/411
[58] Field of Search ............... 210/186, 108, 407, 408, 210/409, 411, 354, 351

[56] References Cited

U.S. PATENT DOCUMENTS 4,156,651  5/1979  Mehoudar ......................... 210/108

FOREIGN PATENT DOCUMENTS 0058656  9/1982  European Pat. Off. .
3705803  9/1987  Fed. Rep. of Germany .
413677   8/1934  United Kingdom .

Primary Examiner—Peter Hruskoci
Assistant Examiner—Robert J. Popovics
Attorney, Agent, or Firm—Brumbaugh, Graves, Donohue & Raymond

[57] ABSTRACT

A filtering apparatus for separating solid and suspended matter from liquids which includes a cylindrical housing, a cylindrical filter basket coaxially installed therein and delimiting a space I (FIG. 1) receiving the liquid to be filtered relative to an external annular space II receiving the filtratre, and a backflushing device axially displaceable by means of a drive and including at least one piston disc provided with a channel connecting the external annular space II, via perforations provided in the filter basket, with a hollow space III of a central tube provided coaxially with the filter basket and carrying the piston disc. The piston disc lies at the interior surface of the filter basket via seals. In order to be able to filter non-lubricating, aggressive and abrasive media by safeguarding a long service life and a low susceptance to failure of the filtering apparatus, the central tube constitutes a movable structural unit together with the piston disc and a discharge tube for backflush liquid running into the cavity III of the central tube. A dynamic seal is provided between the axially movable central tube and the housing. The drive engages at the closed end of the central tube carrying the discharge tube.

4 Claims, 1 Drawing Sheet

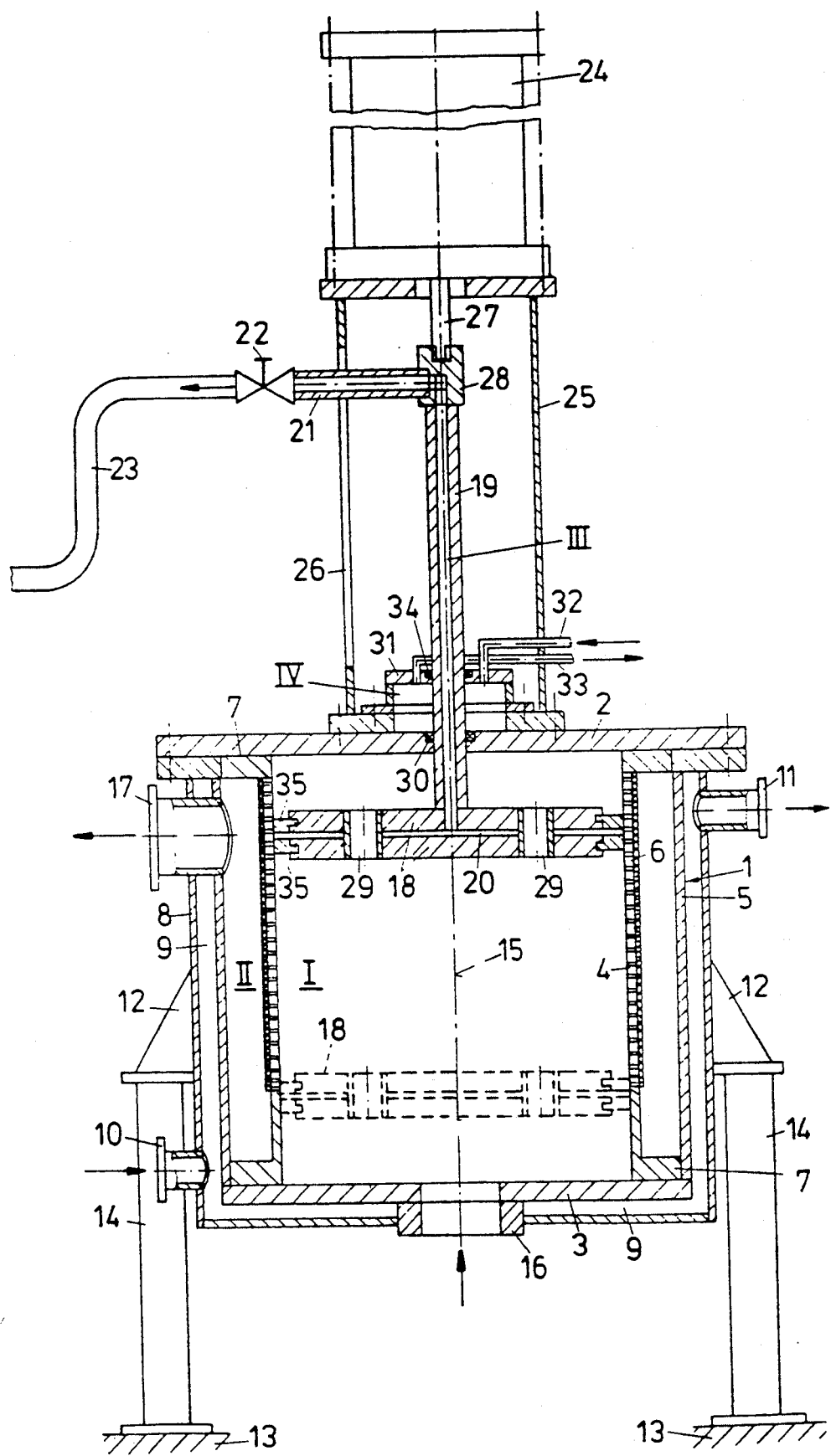

FILTERING APPARATUS FOR SEPARATING SOLID AND SUSPENDED MATTER FROM A LIQUID

The invention relates to a filtering apparatus for separating solid and suspended matter from liquids, which comprises a cylindrical housing, a cylindrical filter basket coaxially installed therein and delimiting a space I receiving the liquid to be filtered relative to an external annular space II receiving the filtrate, and a backflushing device axially displaceable by means of a drive and including at least one piston disc provided with a channel connecting the external annular space II, via perforations provided in the filter basket, with a hollow space III of a central tube provided coaxially with the filter basket and carrying the piston disc, the piston disc lying at the interior surface of the filter basket via seals.

A filtering device of this type is known from U.S. Pat. No. 3,994,810. It serves to filter viscose by separating only with difficulty filterable gel particles and residues therefrom. Such particles are kept back by the filter material. To clean the filter material, the filter material, after having reached a certain degree of contamination, is flushed with already filtered liquid in the reverse flow, which is called "backflushing".

With the known construction, the backflush fluid is conducted through an axially displaceable central tube into a collecting tube arranged stationarily and coaxially therewith and is withdrawn through the same. The central tube is arranged to be axially movable within the collecting tube by a threaded spindle, which reaches into the central tube and is led outwards through the closed end of the collecting tube, being there coupled to a driving motor.

With this construction, it is disadvantageous that the backflush fluid contacts a seal provided between the central tube and the housing of the filtering device and, moreover, surrounds the threaded spindle, thus also contacting the seal provided between the threaded spindle and the collecting tube.

If this known device were used to filter and screen aggressive or abrasive as well as non-lubricating media, this involves not only a high wear of the movable parts passed by the backflush liquid, but also an intensive stress and a high wear of the seals contacted by the backflush liquid.

The invention aims at avoiding these disadvantages and difficulties and has as its object to provide a filtering apparatus of the initially defined kind, which enables such non-lubricating or aggressive or abrasive media, such as, e.g., dissolved or melted high polymers (lacquers, dispersions, etc., acrylic solutions), to be filtered, nevertheless safeguarding a long service life as well as a low susceptance to failure and little maintenance of the filtering apparatus.

In accordance with the invention, this object is achieved in that the central tube constitutes a movable structural unit together with the piston disc and a discharge pipe for backflush liquid running into the hollow space III of the central tube, a dynamic seal is provided between the axially movable central tube and the housing, and the drive of the backflushing device engages at the closed end of the central tube carrying the discharge pipe externally thereof.

With special applications, e.g., when filtering liquids that solidify at air contact, the dynamic seal provided between the axially movable central tube and the housing advantageously is surrounded by a flush casing defining a flushing space IV, which flush casing is sealed relative to the central tube by a further dynamic seal, a supply and a discharge duct for flushing liquid suitably running into the flush casing.

Thereby, liquid to be filtered possibly penetrating the dynamic seal provided between the housing and the central tube is washed off the central tube or diluted such that the formation of a deposit adhering to the central tube and affecting the seal is avoided. Thus, the dynamic seal arranged externally between the flush casing and the central tube no longer is contacted by the liquid to be filtered so that this seal has a particularly long service life.

In order to be able to employ the filtering apparatus with melted high polymers solidified at room temperature, the housing of the filtering apparatus advantageously is surrounded by an external jacket defining a cavity surrounding the housing, into which a supply and a discharge duct for heating medium enter.

BRIEF DESCRIPTION OF THE DRAWINGS

The drawing shows an axial cross section of the filtering apparatus.

The invention will be explained in more detail by way of one exemplary embodiment illustrated in the drawing, which is an axial section through a filtering apparatus.

The filtering apparatus illustrated in the drawing comprises an upright cylindrical housing 1 closed by housing lids 2, 3 on its ends. Within the housing 1, there is provided a perforated cylindrical filter basket 4, which separates an internal space I from an external annular space II provided between the filter basket 4 and the jacket 5 of the housing. On its outer jacket, the filter basket carries a filter material 6 secured to the filter basket 4 by a clamping shell not illustrated. The filter basket 4 is supported on the housing 1 via annular flanges 7 in a manner so as to be aligned and held coaxially with the housing 1.

The housing 1, on its outer side is surrounded by an external jacket 8 defining a cavity 9 surrounding the housing 1. This cavity 9 may be connected to a liquid heating medium by a supply duct 10 arranged around the external jacket 8, which heating medium is discharged through a discharge duct 11. The external jacket 8 extends from the upper housing lid 2 to beyond the lower housing lid 3 such that the lower housing lid 3 likewisely is surrounded by the cavity 9 on its external side. Supporting consoles 12 are provided peripherally on the external jacket, resting on supporting columns 14 arranged on the base 13, so that the housing of the filtering apparatus is supported relative to the base 13 with its central axis 15 being vertical.

A connection piece 16 enters centrally in the lower housing lid 3 to introduce the liquid to be filtered into the housing 1, i.e., into the internal space I. The filtrate is withdrawn through a discharge connection piece 17 arranged near the upper housing lid 2 and passing through the external jacket 8.

A backflushing device is comprised of a piston disc 18 arranged coaxially with the housing 1 and rigidly connected in a fluid tight manner with a coaxially arranged central tube 19 led outwards from the housing 1 through the upper housing lid 2. The piston disc 18 includes a channel 20 connecting the external annular space II with the hollow space III of the central tube 19 in a duct-like manner via the holes of the filter basket 4.

To the outside end of the central tube 19, a discharge pipe 21 is mounted in a likewisely rigid and fluid tight manner, to which a flexible discharge tube 23 is connected via a valve 22. The hollow space III of the central tube runs into the discharge pipe. The piston disc 18, thus, constitutes a structural unit with the central tube 19 and the discharge pipe 21, which structural unit is movable relative to the housing 1 by means of a drive 24. The drive 24 is formed by a pressure medium cylinder mounted to the upper housing lid 2 by means of a supporting tube 25. The supporting tube 25 has a lateral longitudinal slot 26, through which the discharge pipe 21 projects outwards.

The piston rod 27 of the pressure medium cylinder 24 externally engages in an end piece 28 disposed on the end of the central tube 19, which end piece additionally carries the discharge pipe 21 and is closed in the axial direction of the central tube 19.

The piston disc 18 includes passages 29 so that the space I present below and above the piston disc within the filter basket 4 is not divided by the piston disc 18 as the latter is moved.

The sealing of the central tube 19 relative to the upper housing lid 2 is of a particular importance. A dynamic seal 30 designed as an annular sealing lip is inserted there. This seal is surrounded by a flush casing 31 delimiting a flushing space IV, into which a supply duct 32 for flushing medium enters and from which a discharge duct 33 for flushing medium departs. This flush casing 31, in turn, is sealed relative to the central tube 19 by a further dynamic seal 34 arranged at a distance from the dynamic seal 30 inserted in the housing lid 2 and likewisely designed as an annular sealing lip.

The filtering apparatus functions in the following manner:

The liquid to be filtered, which is introduced into space I via the connection piece 16, reaches the filter material 6 through the holes of the filter basket 4, the solid portions being retained in the filter material. The cleaned liquid is pressed through the filter material 6 into annular space II and, from there, is discharged through the discharge connection piece 17.

During normal filtering, the piston disc 18 is in the lower position illustrated in broken lines in which the filter basket 4 has no holes so that the connection between the annular space II and the hollow space III of the central tube 19 is interrupted.

During the backflushing phase, the piston disc 18 is moved from bottom to top and back to bottom at a uniform speed. Filtering is continued during this passage, only a narrow annular region that corresponds to the thickness of the piston disc 18 being covered for filtration. Since a higher pressure prevails in the annular space II than in the channel 20 of the piston disc 18, a small portion of the already filtered liquid is pressed from the annular space II into channel 20, thus flushing the filter material free from solid particles collected there. The backflush liquid is withdrawn through the hollow space III of the central tube 19, the discharge pipe 21 and the flexible tube 23 connected thereto. In doing so, it is essential that the backflush liquid does not get into contact with any of the dynamic seals—except for the seal provided between the piston disc 18 and the filter basket 4, which is formed by piston rings 35.

The control of the filter apparatus as well as the configuration of the filter basket 4 with its perforations and the seal 35 of the piston disc advantageously are the same as with the filtering apparatus described in EP-B-0 058 656.

What I claimed is:

1. In a filtering apparatus for separating solid and suspended matter from a liquid to be filtered so as to obtain a filtrate, of the type including a cylindrical housing, a cylindrical filter basket having perforations and coaxially installed within said cylindrical housing, said cylindrical filter basket defining a first space constructed and arranged to receive said liquid to be filtered, an annular space constructed and arranged to receive said filtrate being provided outside of said cylindrical filter basket and delimited relative to said first space by said filter basket, a backflushing means constructed and arranged to receive backflush liquid and including a drive for axially displacing said backflushing means and an axially movable central tube arranged coaxially with said filter basket and defining a hollow space, said backflushing means being formed by at least one piston disc supported by said central tube and including a channel constructed and arranged to connect said annular space with said hollow space via said perforations of said cylindrical filter basket, and seals provided intermediate said filter basket and said piston disc for said piston disc to lie at said filter basket's interior surface, the improvement comprising a discharge pipe for said backflush liquid entering into said hollow space of said axially movable central tube, said central tube having means closing the end of said central tube in the axial direction, said discharge pipe being mounted on said closing means and movable with said central tube wherein said discharge pipe, central tube and said piston disc move together as a structural unit, a first dynamic seal provided between said axially movable central tube and said housing, and said drive of said backflushing means engaging at said closing means externally thereof.

2. A filtering apparatus as set forth in claim 1, further comprising a flush casing defining a flushing space and surrounding said first dynamic seal provided between said axially movable central tube and said housing, and a second dynamic seal constructed and arranged to seal said flush casing relative to said central tube.

3. A filtering apparatus as set forth in claim 2, further comprising a flushing liquid supply duct and a flushing liquid discharge duct running into said flush casing.

4. A filtering apparatus as set forth in claim 1, further comprising an external jacket surrounding said housing by defining a cavity also surrounding said housing and a heating medium supply duct and a heating medium discharge duct running into said cavity.

* * * * *